(12) United States Patent
Szu-Yao

(10) Patent No.: US 8,162,345 B1
(45) Date of Patent: Apr. 24, 2012

(54) FOLDABLE BICYCLE

(75) Inventor: Chung Szu-Yao, Taipei (TW)

(73) Assignee: Chanton Trading Co., Ltd, New Taipei (TW)

( * ) Notice: Subject to any disclaimer, the term of this patent is extended or adjusted under 35 U.S.C. 154(b) by 0 days.

(21) Appl. No.: 13/027,332

(22) Filed: Feb. 15, 2011

(51) Int. Cl.
*B62K 15/00* (2006.01)
(52) U.S. Cl. ........................................ 280/287; 280/278
(58) Field of Classification Search .................. 280/278, 280/287
See application file for complete search history.

(56) References Cited

U.S. PATENT DOCUMENTS

| | | | |
|---|---|---|---|
| 4,438,942 A * | 3/1984 | Hon | 280/278 |
| 5,398,955 A * | 3/1995 | Yeh | 280/287 |
| 5,590,895 A * | 1/1997 | Hiramoto | 280/278 |
| 5,836,602 A * | 11/1998 | Wang | 280/287 |
| 6,336,649 B1 * | 1/2002 | Lin | 280/278 |
| 6,364,335 B1 * | 4/2002 | Mombelli | 280/287 |
| 6,641,159 B1 * | 11/2003 | Fan | 280/278 |
| 6,799,771 B2 * | 10/2004 | Bigot | 280/278 |
| 7,306,249 B2 * | 12/2007 | Kwok et al. | 280/278 |
| 7,591,473 B2 * | 9/2009 | Tak-Wei Hon et al. | 280/278 |
| 2008/0224441 A1 * | 9/2008 | Lu | 280/278 |

\* cited by examiner

*Primary Examiner* — Kevin Hurley
*Assistant Examiner* — Marc Scharich
(74) *Attorney, Agent, or Firm* — Chun-Ming Shih

(57) ABSTRACT

A foldable bicycle includes a frame, gears and two wheels. The frame includes a front vertical tubular portion, a front horizontal tubular portion, a hinge, a rear horizontal tubular portion and a seat-supporting tubular portion. A lopsided portion is disposed above the front fork. One piece of the hinge is welded to the rear end of the front horizontal tubular portion, and another piece is welded to the front end of the rear horizontal tubular portion. The seat-supporting tubular portion is positioned by a positioning rod. Therefore, the foldable bicycle of the present invention may be folded up into a smallest volume and then may be stored away easily through its positioning unit, hinge and positioning rod. Also, its two small wheels fitted to the rear rack enable the bicycle in a folded condition to be moved around easily.

13 Claims, 13 Drawing Sheets

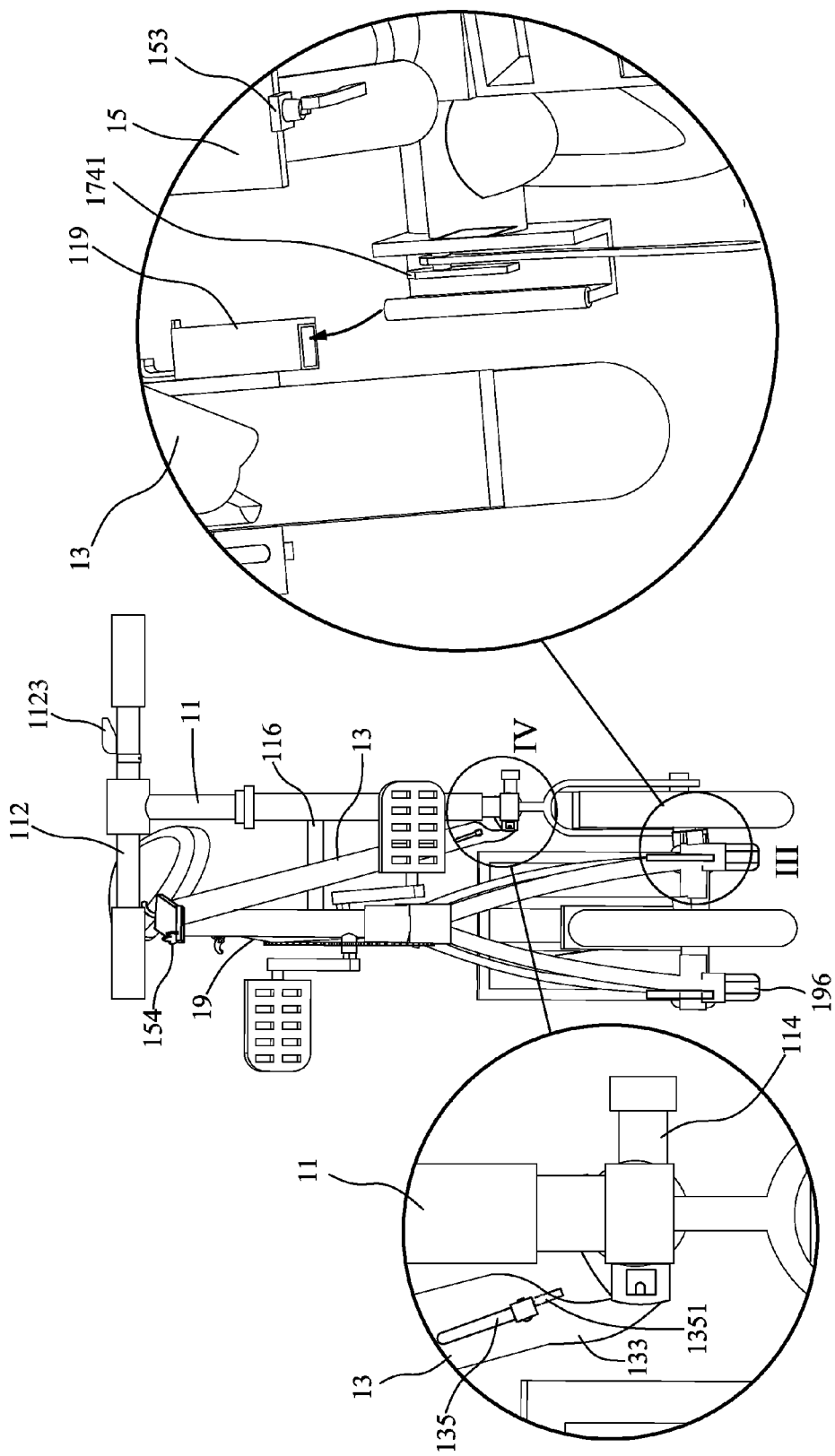

FOLDABLE BICYCLE

BACKGROUND OF THE INVENTION

1. Field of the Invention

The invention generally relates to a foldable bicycle which may be folded into a smallest volume. Such design may be used for small-wheel bicycles used in leisure activities, small-wheel electric bicycles, electric motorcycles and other vehicles.

2. Description of the Prior Art

Our living standard has been brought up by the swift economic progress. Because we often use motorcycles, automobiles and elevators, we are lack of exercise. In the modern society, we have been plagued by illnesses associated with such economic progress. Many of us may jog, walk, play basketball or football or ride a bicycle so as to exercise. In addition, in order to reduce carbon footprint, more and more people ride a bicycle.

There are many types of bicycles, including race bicycles, mountain bicycles and small-wheel bicycles used in leisure activities. With the prevalence of bicycle riding, many of us would bring a bicycle with us when we go to a mountain area so as to fully enjoy the beauty of the nature while riding the bicycle. In the past, to bring a bicycle with us, many of us put a bicycle on a rack fitted on top of the roof of our car or in the trunk of our car. Though a bike rack fitted to the roof of our car is convenient, the bicycle may damage the roof of our car due to the bumpy ride on a rough terrain or may fall off the rack and cause danger.

Therefore, foldable bicycle has become quite popular. After such bike is folded, it may be easily fitted into a car and hence there is no chance that it may fall off the rack. Please see FIG. 1 for the foldable bicycle in the prior art. As illustrated in FIG. 1, a folding design "a" is provided on the crossbar so that the frame may be folded into half of its length. Though the folded bike has a reduced length, the overall shape is quite irregular. In addition, though the bike may be equipped with a side stand, the folded bike can not stand erect and hence it can not be stored away easily. Moreover, when we need to move it around, we need to lift it and carry it around. Furthermore, because the front portion of the crossbar is not fixedly connected with the rear portion of the crossbar, the folded bike is not easy to be carried around.

To eliminate the disadvantages in the prior art, the inventor has put a lot of effort into the subject and has successfully come up with the foldable bicycle of the present invention.

SUMMARY OF THE INVENTION

An object of the present invention is to provide a foldable bicycle that may be folded up into a smallest volume and a substantially cubic shape and then may be stored away easily.

Another object of the present invention is to provide a foldable bicycle that, after it is folded, it may stand erect and hence we may move it around easily due to the two small wheels fitted to its rear rack.

A third object of the present invention is to provide a foldable bicycle with linkages to fixedly connect the front half of the bicycle with the rear half of the bicycle.

To reach these objects, the foldable bicycle of the present invention is disclosed. The foldable bicycle of the present invention comprises a frame, gears and two wheels. The frame comprises a front vertical tubular portion, a front horizontal tubular portion, a hinge, a rear horizontal tubular portion and a seat-supporting tubular portion. A lopsided portion is disposed above the front fork. A positioning unit is disposed on and passes through the lopsided portion. A matching lopsided portion is provided on the front horizontal tubular portion, and a matching positioning member is provided in the matching lopsided portion. One piece of the hinge is welded to the rear end of the front horizontal tubular portion, and the other piece of the hinge is welded to the front end of the rear horizontal tubular portion. The seat-supporting tubular portion is fitted to the rear horizontal tubular portion. The seat-supporting tubular portion is positioned by a positioning rod.

In comparison to the prior art, the foldable bicycle of the present invention has the following advantages:

1. The foldable bicycle of the present invention may be folded up into a smallest volume and then may be stored away easily through its positioning unit, hinge and positioning rod.
2. Its two small wheels fitted to the rear rack enable the bicycle in a folded condition to be moved around easily.

BRIEF DESCRIPTION OF THE DRAWINGS

FIGS. 5 and 6 are two views illustrating the foldable bicycle of the present invention in a folded condition.

FIGS. 6A and 6C are two enlarged views of part III in FIG. 6, showing how the vertically oriented male connective unit provided on the rear fork engages with the horizontally oriented female connective unit of the front fork.

FIG. 6B is an enlarged view of part IV in FIG. 6, showing the retractable rod provided on the matching lopsided portion.

DETAILED DESCRIPTION OF THE PREFERRED EMBODIMENT

Figure 1:
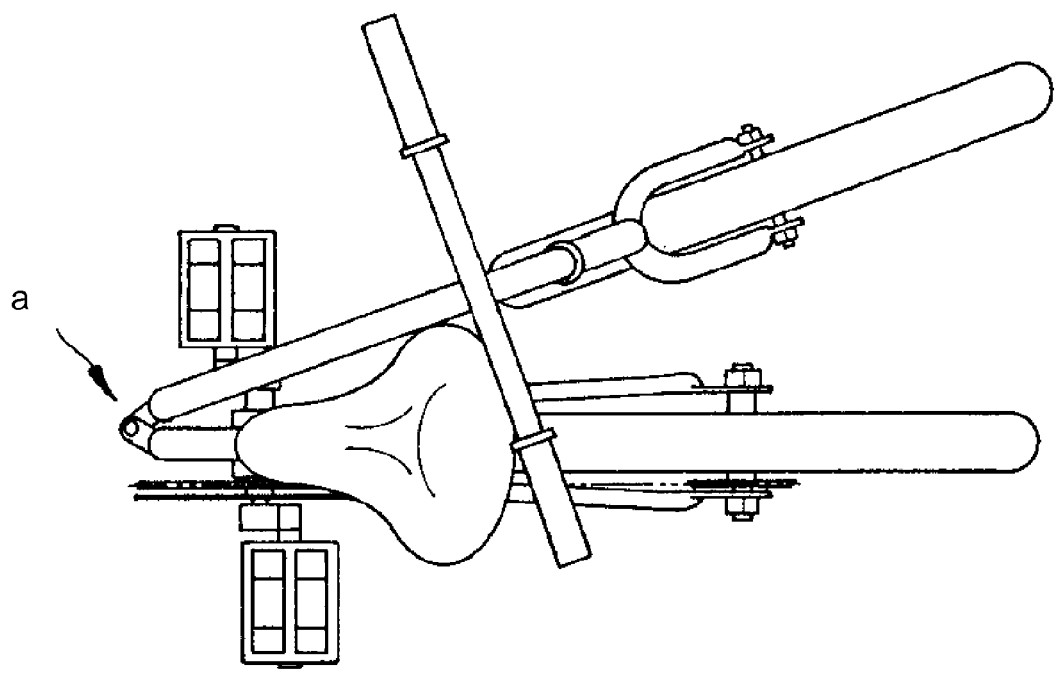
FIG. 1 is a top view showing how a foldable bicycle in the prior art is folded.
Figure 2:
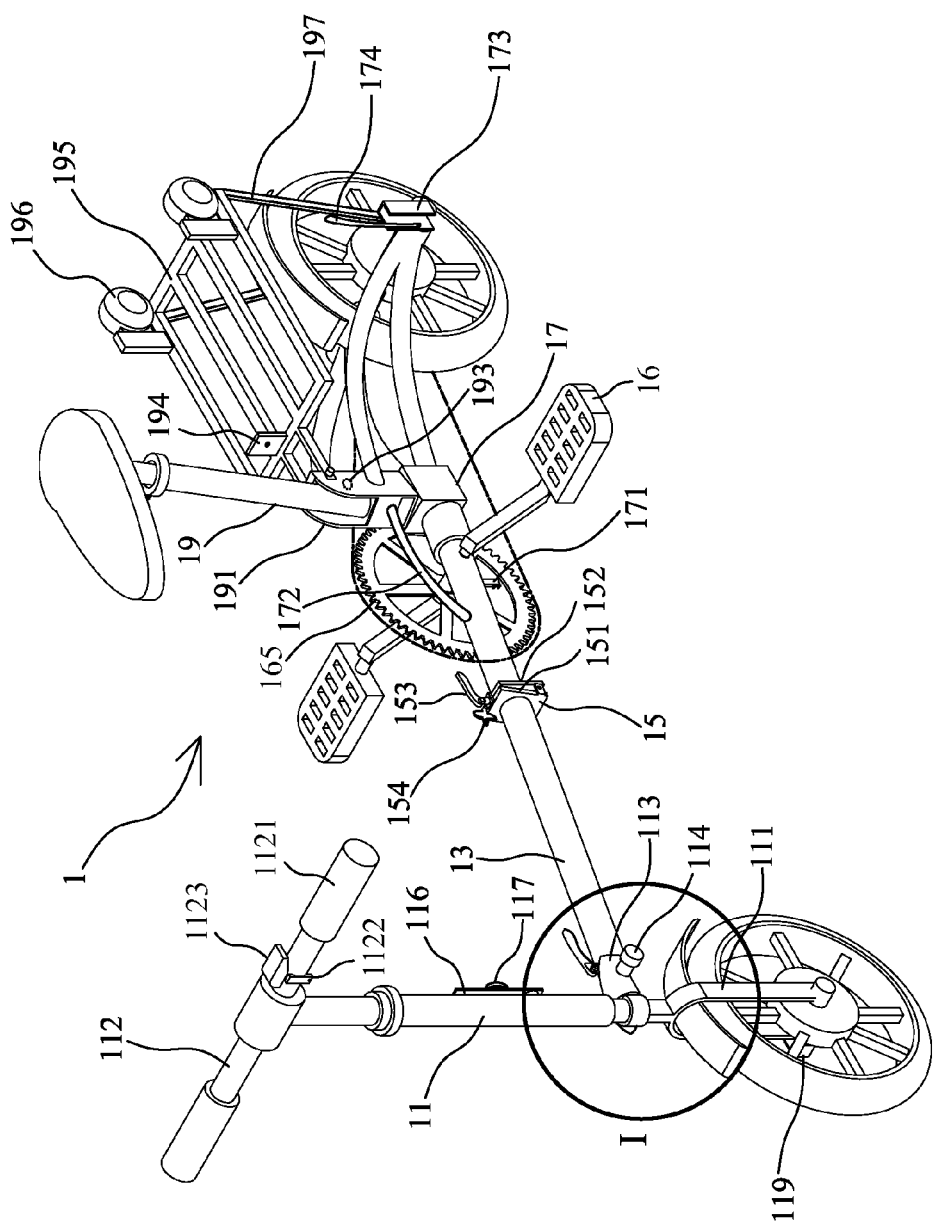
FIG. 2 is a perspective view of the foldable bicycle of the present invention.

Please refer to FIG. 2. The foldable bicycle 1 of the present invention comprises a frame, gears and two wheels. The frame comprises a front vertical tubular portion 11, a front horizontal tubular portion 13, a hinge 15, a rear horizontal tubular portion 17 and a seat-supporting tubular portion 19. A front fork 111 is connected with the vertical tubular portion 11 and a front wheel is pivotally connected with the front fork 111. A horizontally oriented female connective unit 119 is provided on one side of the front fork 111, and a flexible strip is provided in the female connective unit 119 so as to function as a catching member. A T-shaped handle portion 112 is disposed on top of the front fork 111 and at least a connective member 1123 is provided on the T-shaped handle portion 112. Please also refer to FIG. 8, which illustrates the foldable bicycle 1 of the present invention in a folded condition. The left handlebar 1121 is pivotally connected with the T-shaped handle portion 112 through a pivot 1122. A matching connective member 1124, which may be connected with the connective member 1123, is provided on the T-shaped handle portion 112 so that the handlebar 1121 may be folded into a horizontal position. A lopsided portion 113 is horizontally disposed above the front fork 111. A positioning unit 114, which is provided with a spring, is disposed on and passes through the lopsided portion 113. The positioning unit 114 may be in form of a bolt or a pin. Please refer to FIGS. 4C and 4D. If the positioning unit 114 is in form of a bolt 114a, a hole is provided in the lopsided portion 113, and an extension portion 1131, which may extend horizontally, is provided on the lopsided portion 113. One or more positioning holes 1132 are provided in the extension portion 1131. In the preferred embodiment, only one positioning hole 1132 is used. Now, please refer to FIG. 2 again. Moreover, a connective unit 116 is provided in the middle part of the front vertical tubular portion 11, and a grip portion 117 is provided on the connective unit 116. A matching lopsided portion 131 is provided on the front horizontal tubular portion 13, and a matching positioning member 132 is provided in the matching lopsided portion 131. The matching positioning member 132 is a nut 132a embedded in the matching lopsided portion 131 and the nut 132a may engage with the positioning unit 114. One or more retractable rods 1351 are provided in the matching lopsided portion 131 and may engage with the positioning hole 1132, and the number of the retractable rods 1351 is the same with the number of the positioning holes 1132. The hinge 15 is fitted with its open end facing upwards and its pivotal end facing downwards. One 151 of its two pieces is welded to the end of the front horizontal tubular portion 13, and another piece 152 is welded to the end of the rear horizontal tubular portion 17. A lever 153, provided with a spring, and a slot are provided on the upper portion of the piece 151. Another slot and a catch 154 are provided on the upper portion of the piece 152. Therefore, as the two pieces 151 and 152 come together, the catch 154 may connect with the slot and the lever 153 may engage with the other slot. The piece 152 is welded to one end of the rear horizontal tubular portion 17. Two pedals 16 and the gears 165 are fitted on the middle portion of the rear horizontal tubular portion 17. One end of a grip rod 172 is welded to the rear horizontal tubular portion 17, and the rear fork is welded to the rear horizontal tubular portion 17. The matching connective unit 171 is provided on the rear horizontal tubular portion 17, and the vertically oriented male connective unit 173 is provided on the rear fork. A piece 1741 is provided on the male connective unit 173 (please see FIG. 6A) and is controlled by a lever 174. In addition, the male connective unit 173 is vertically oriented, and the female connective unit 119 is horizontally oriented. Also, a first positioning portion 193 is provided on the lower part of the seat-supporting tubular portion 19.

The seat-supporting tubular portion 19 is adjustable on its height and is seated on the seating portion 191. The seating portion 191 is connected with the rear horizontal tubular portion 17 and an angle is formed between the former and the latter. In addition, the seating portion 191 is connected with the rear fork and the other end of the grip rod 172. A rack 195 is connected with the seating portion 191 so that the rack 195 is over the rear wheel. One or more small wheels 196' are fitted to the rear end of the rack 195. In the preferred embodiment, two small wheels 196 are fitted to the rack 195. A second positioning portion 194 is provided on the front end of the rack 195. Two supporting rods 197 are used to connect the rack with the rear fork.

Figure 3:
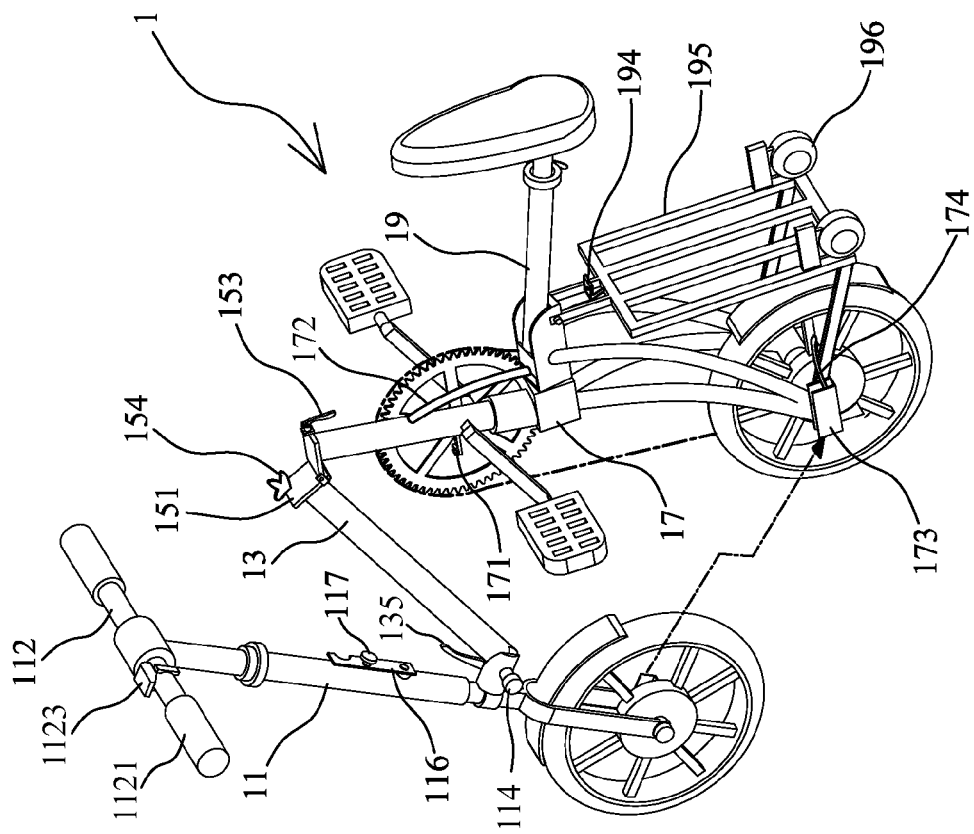
FIG. 3 is a perspective view showing how the foldable bicycle of the present invention is folded and how its hinge facilitates the folding.
Figure 4A:
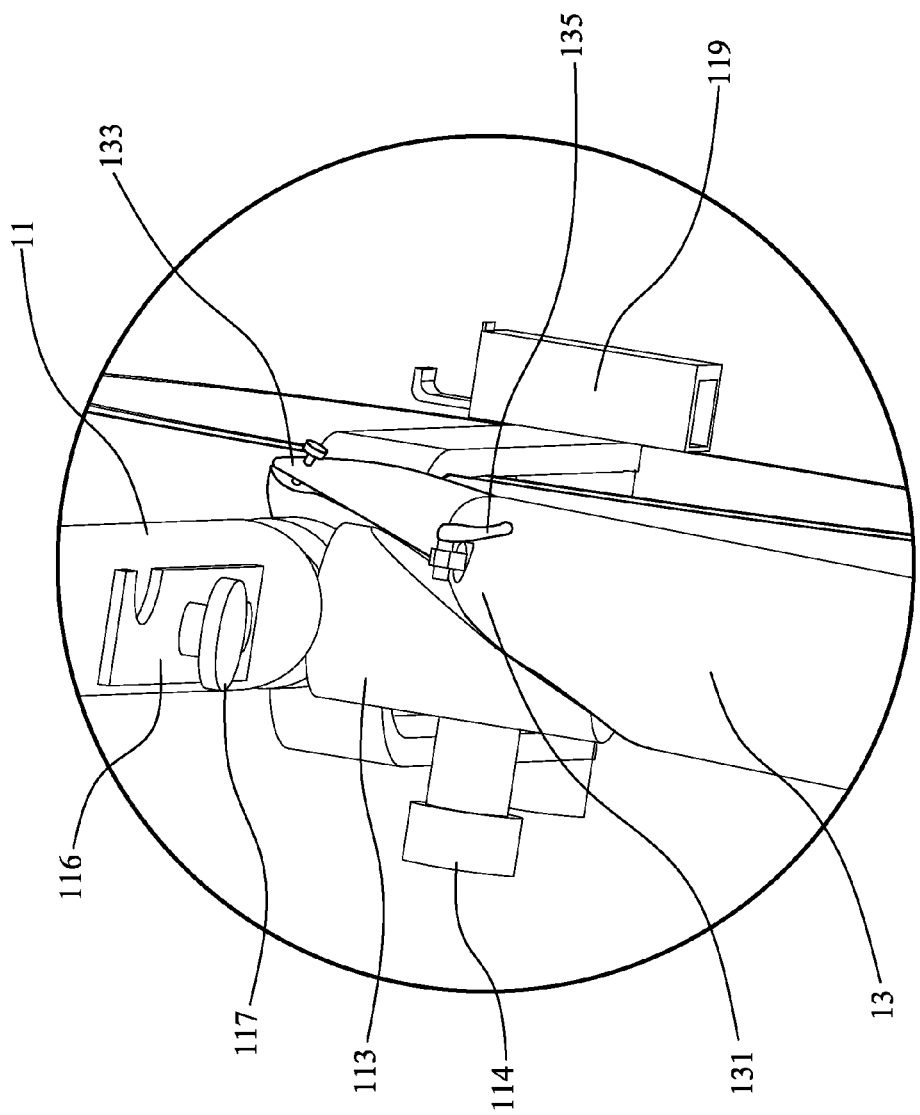
FIGS. 4A and 4B are two enlarged views of part I in FIG. 2, showing the lopsided portion of the front vertical tubular portion and the matching lopsided portion of the front horizontal tubular portion.
Figure 4B:
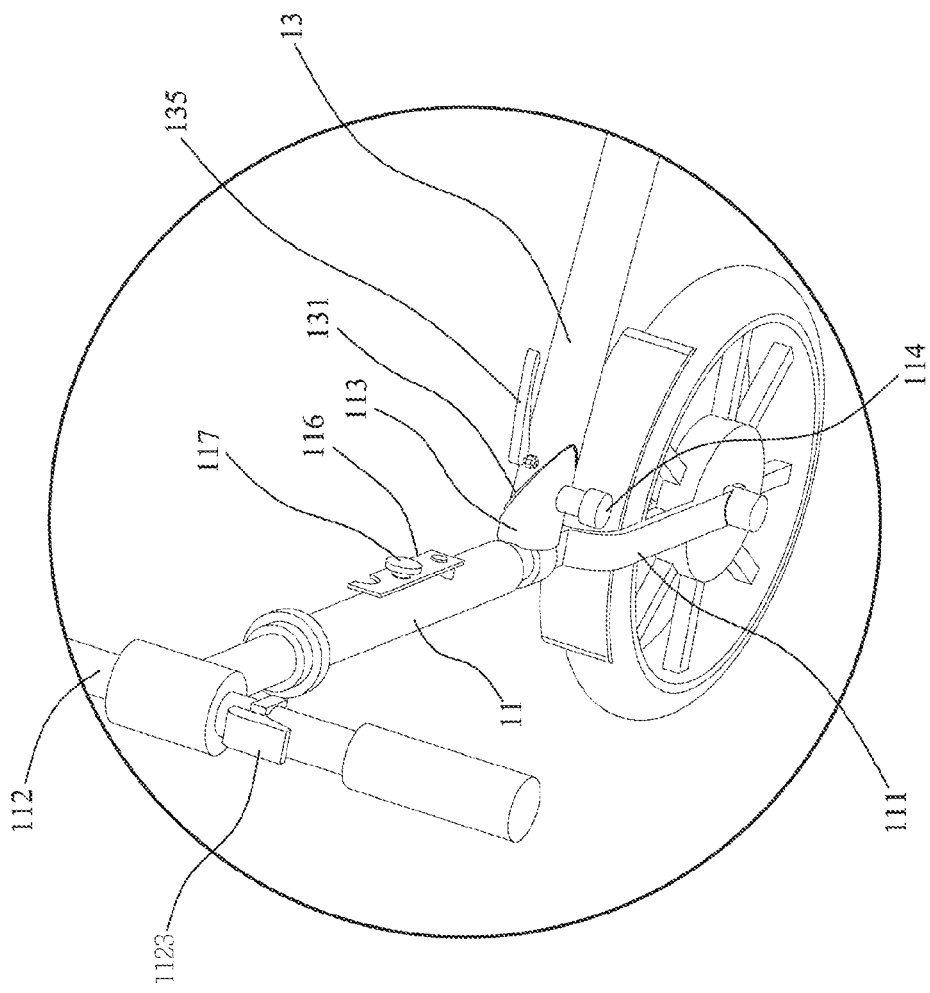
Figure 4C:
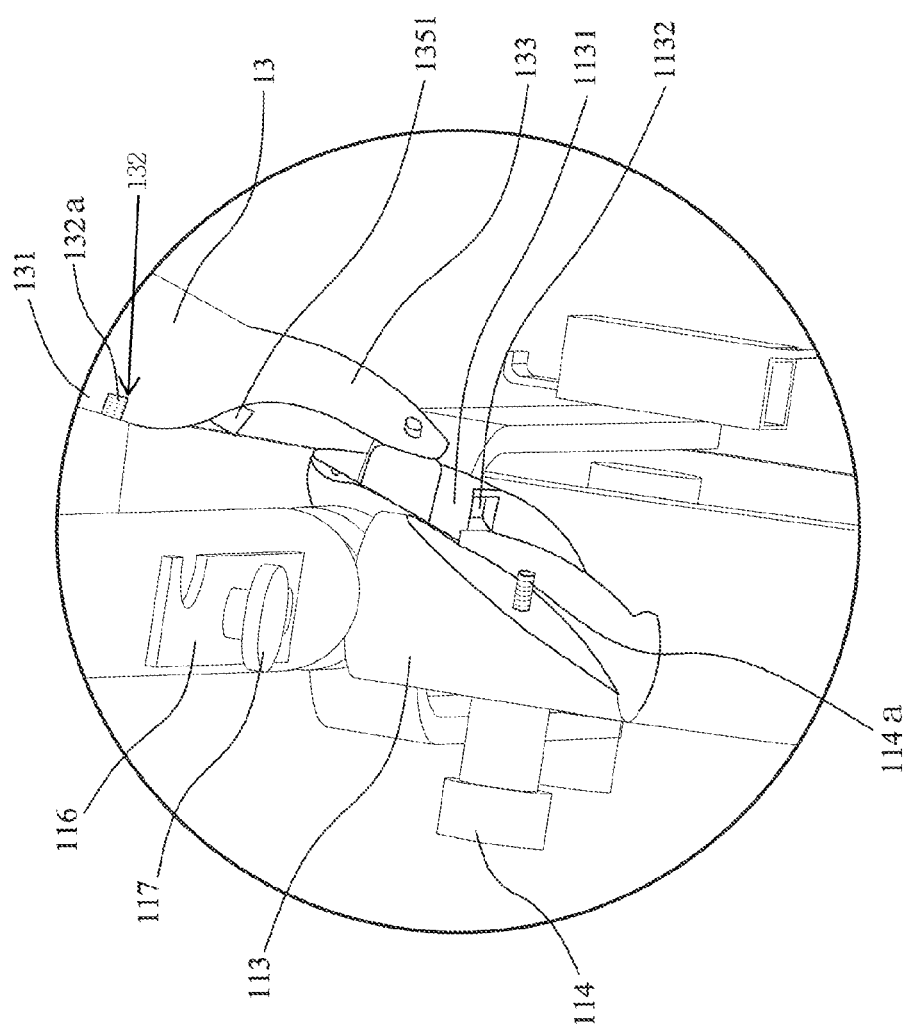
FIG. 4C is an enlarged view of part I in FIG. 2, showing one or more holes in the extension portion.
Figure 4D:
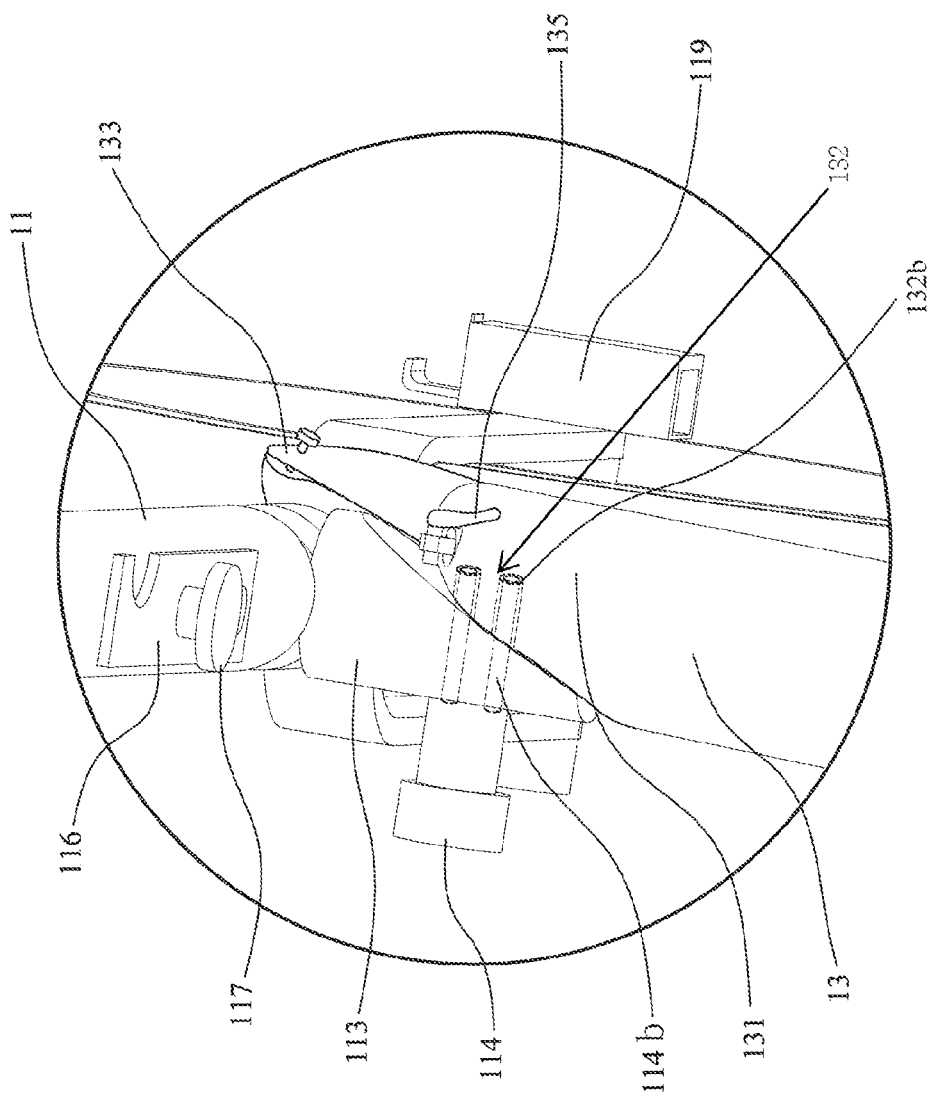
FIG. 4D is a view illustrating another design for the positioning unit.

FIG. 3 illustrates how the foldable bicycle of the present invention is folded and how its hinge facilitates the folding. FIGS. 4A and 4B are two enlarged views of part I in FIG. 2, showing the lopsided portion of the front vertical tubular portion and the matching lopsided portion of the front horizontal tubular portion. FIG. 4C is an enlarged view of part I in FIG. 2, showing one or more holes in the extension portion. FIG. 4D is a view illustrating another design for the positioning unit. Now, please refer to FIGS. 3, 4A, 4B and 4C. As illustrated in these figures, when we want to fold up the bicycle, we first undo or unscrew the positioning unit 114 and pull up the control lever 135 to release the lopsided portion 113 and the matching lopsided portion 131. Then, we release the disengagement lever 153 while pressing the catch 154. Next, we may push the seat-supporting tubular portion 19 rearwards or pull the grip portion 172 upwards to fold up the crossbar so that the rear rack 195 becomes perpendicular to the ground or that the two small wheels 196 touch the ground and so that the front vertical tubular portion 11 gets closer and parallel to the rear horizontal tubular portion 17. After the rear horizontal tubular portion 17 becomes vertical, the vertically oriented male connective unit 173 becomes horizontally oriented. Now, we may engage the male connective unit 173 with the horizontally oriented female connective unit 119.

Figure 5:
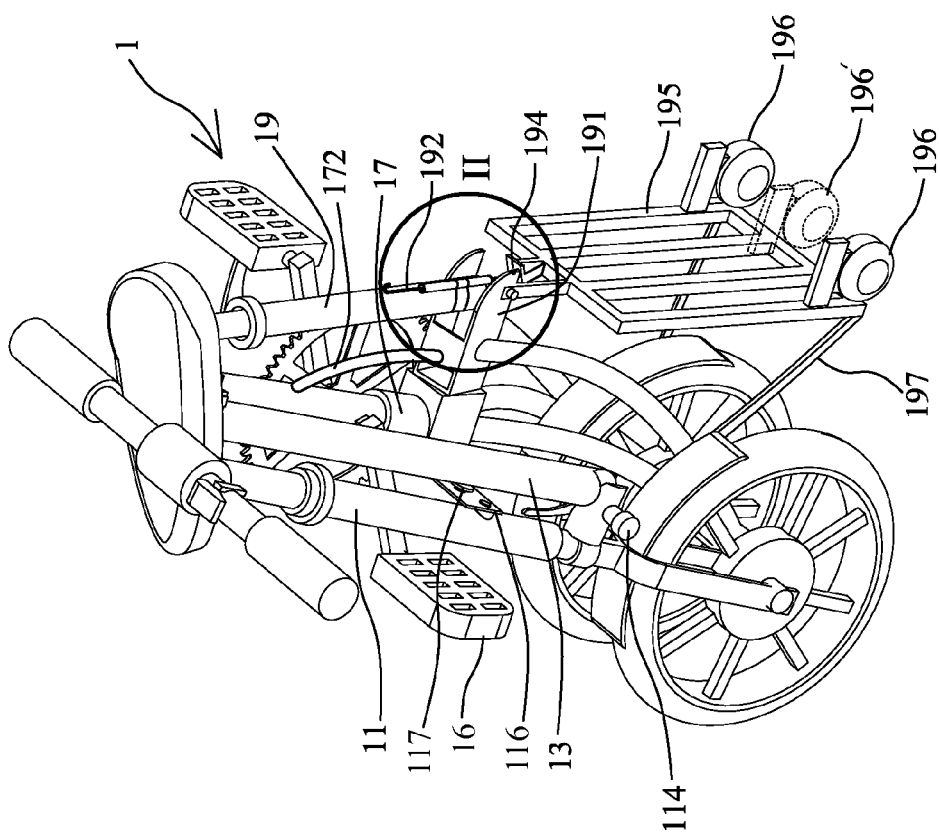
Figure 6C:
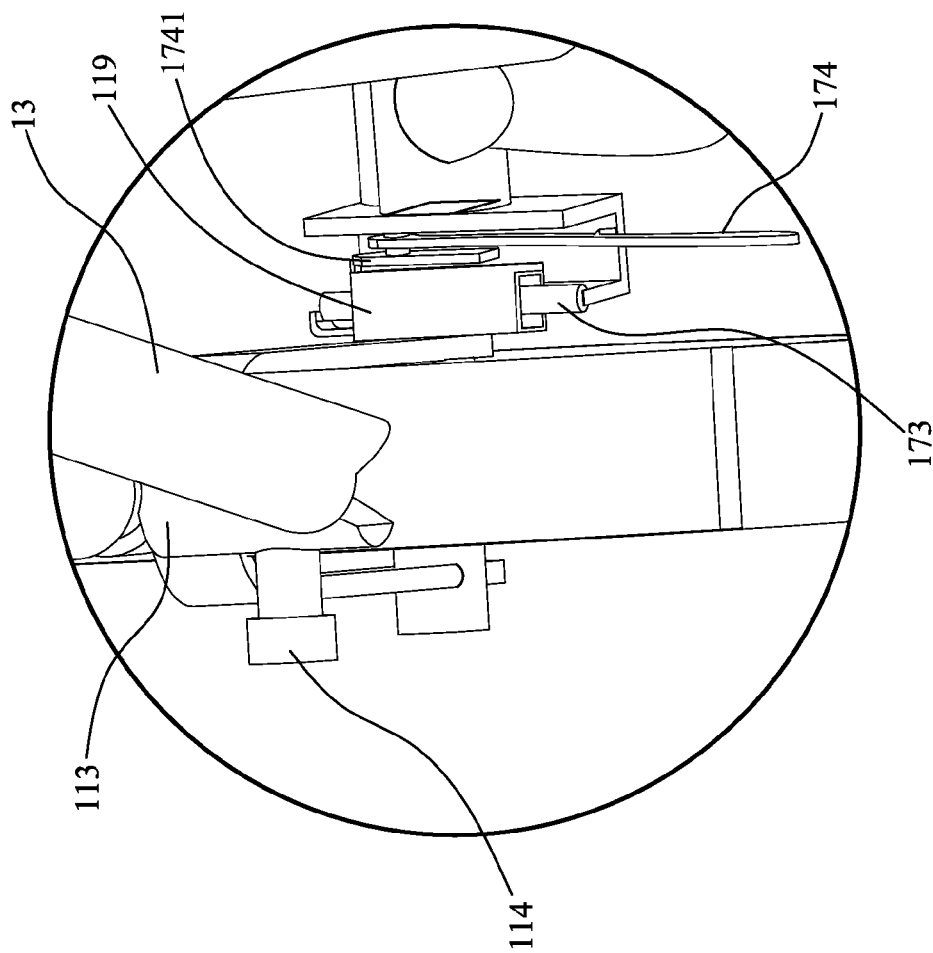

FIGS. 5 and 6 are two views illustrating the foldable bicycle of the present invention in a folded condition. FIGS. 6A and 6C are two enlarged views of part III in FIG. 6, showing how the vertically oriented male connective unit provided on the rear fork engages with the horizontally oriented female connective unit of the front fork. FIG. 6B is an enlarged view of part IV in FIG. 6, showing the retractable rod provided on the matching lopsided portion. Now, please refer to FIGS. 5, 6, 6A, 6B and 6C. After the front wheel and the rear wheel are lined up side to side to each other, we may connect the connective unit 116 on the front vertical tubular portion 11 with the matching connective unit 171 on the rear horizontal tubular portion 17 (not shown in the drawings, please refer to FIG. 3). Therefore, there are two linkages between the front vertical tubular portion 11 and the rear horizontal tubular portion 17.

FIG. 6B is an enlarged view of part IV in FIG. 6, showing the retractable rod provided on the matching lopsided portion. In the preferred embodiment, only one retractable rod 1351 is used. A control lever 135 is provided above the retractable rod 1351 to control the forward and rearward motions of the retractable rod 1351. An extension portion 133 is provided by the retractable rod 1351 and another rod is used to pivotally connect the retractable rod 1351 with a hole in the front vertical tubular portion 11 so that the front horizontal tubular portion 13 is pivotally connected with the front vertical tubular portion 11.

The hinge 15 is fitted with its open end facing upwards and its pivotal end facing downwards. One 151 of its two pieces is welded to the end of the front horizontal tubular portion 13, and another piece 152 is welded to the end of the rear horizontal tubular portion 17. A lever 153, provided with a spring, and a slot are provided on the upper portion of the piece 151. Another slot and a catch 154 are provided on the upper portion of the piece 152. Therefore, as the two pieces 151 and 152 come together, the catch 154 may connect with the slot and the lever 153 may engage with the other slot.

The piece 152 is welded to one end of the rear horizontal tubular portion 17. Two pedals 16 and the gears 165 are fitted to the middle portion of the rear horizontal tubular portion 17. One end of a grip rod 172 is welded to the rear horizontal tubular portion 17, and the rear fork is welded to the rear horizontal tubular portion 17. The matching connective unit 171 is provided on the rear horizontal tubular portion 17, and the vertically oriented male connective unit 173 is provided on the rear fork. A piece 1741 is provided on the male connective unit 173 (please see FIG. 6A) and is controlled by a lever 174. In addition, the male connective unit 173 is vertically oriented, and the female connective unit 119 is horizontally oriented.

The seat-supporting tubular portion 19 is adjustable on its height and is seated on the seating portion 191. The seating portion 191 is connected with the rear horizontal tubular portion 17 and an angle is formed between the former and the latter. Please also refer to FIG. 7A. In addition, the seating portion 191 is connected with the rear fork and the other end of the grip rod 172. A rack 195 is connected with the seating portion 191 so that the rack 195 is over the rear wheel. One or more small wheels 196' are connected to the rear end of the rack 195 (illustrated in FIG. 5). In the preferred embodiment, two small wheels 196 are fitted to the rack 195. Two supporting rods 197 are used to connect the rack with the rear fork. A positioning rod 192 is provided by the seat-supporting tubular portion 19. Also, a first positioning portion 193 is provided on the lower part of the seat-supporting tubular portion 19, and a second positioning portion 194 is provided on the front end of the rack 195.

Figure 7A:
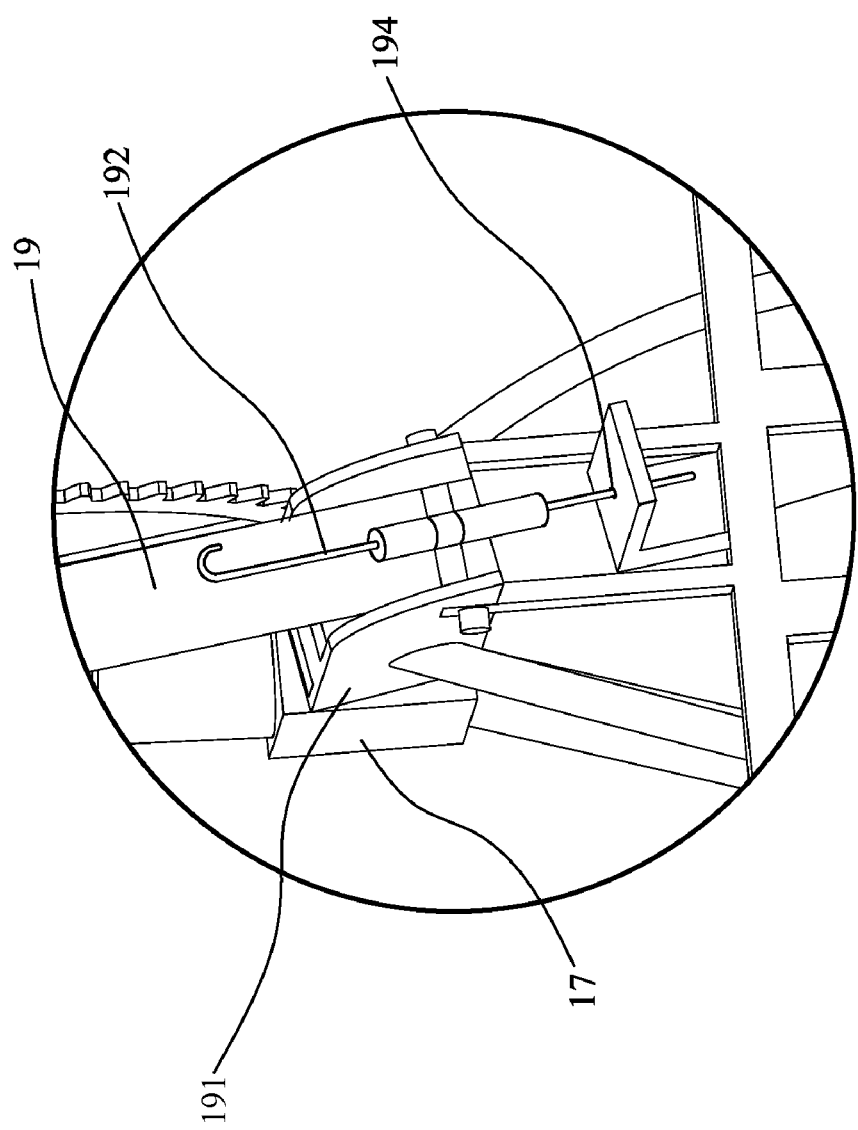
FIGS. 7A and 7B are two enlarged views of part II in FIG. 5, showing how the positioning rod connects with or disconnects from the second positioning portion.
Figure 7B:
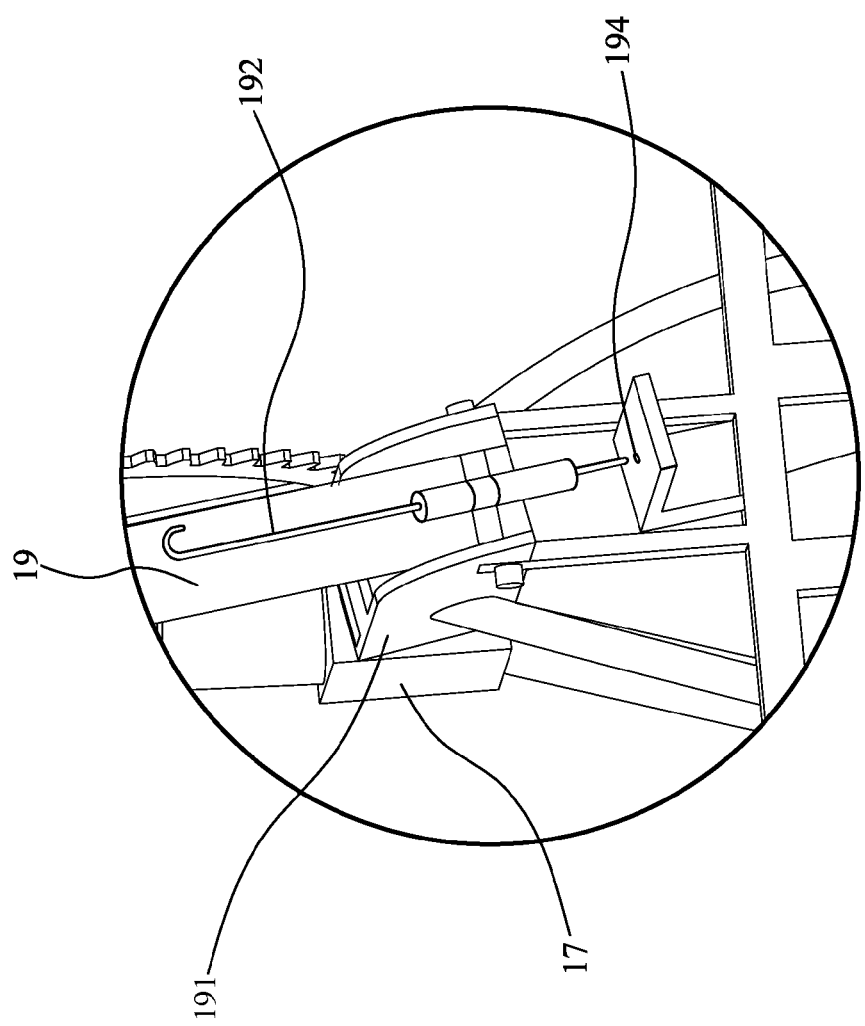
Figure 8:
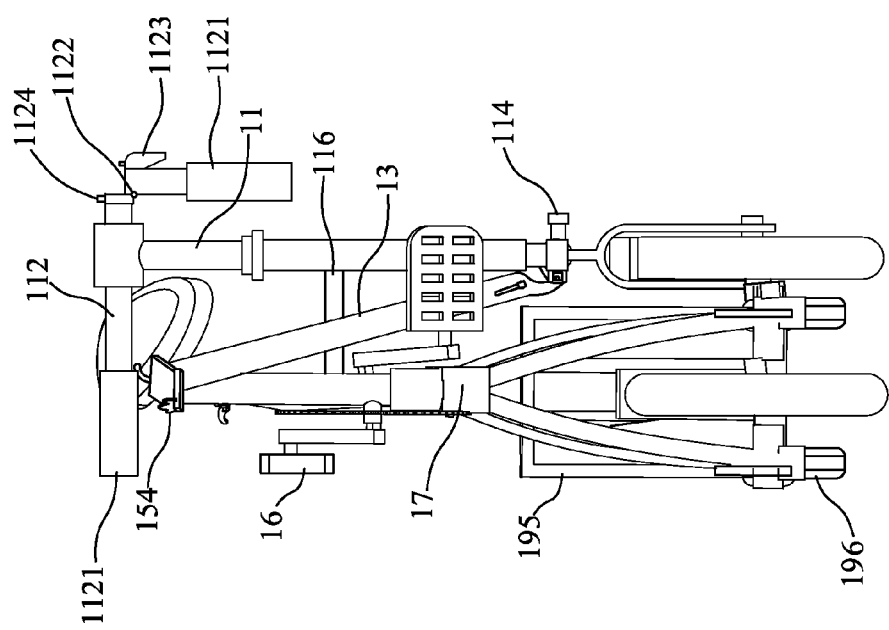
FIG. 8 is a front view illustrating the foldable bicycle of the present invention in a folded condition.

Please refer to FIGS. 7A and 7B. We may pull the positioning rod 192 upwards so as to disconnect the positioning rod 192 from the first positioning portion 193 (please also see FIG. 2) and so that the seat-supporting tubular portion 19 moves downwards with respect to the hinge 15 until the positioning rod 192 connect with the second positioning portion 194. An angle is formed between the seating portion 191 and the rear horizontal tubular portion 17. In the mean time, we may press the connective member 1123 on the handle 1121 so that the connective member 1123 may disconnect from the matching connective member 1124 to enable the handle 1121 to be folded downwards. Moreover, the two pedals 16 may be folded, as illustrated in FIG. 8. Therefore, the foldable bicycle may be folded up into a small volume and a substantially cubic shape and then may be stored away easily. In addition, the folded bicycle can stand erect and may be moved around easily thanks to the two wheels and the two small wheels 196, as illustrated in FIG. 5.

Now, please refer to FIG. 4D, which illustrates another design for the positioning unit 114. The positioning unit 114 is in the form of two pins 114b, and the matching positioning member 132 is two holes 132b that may engage with the two pins 114b. Through this engagement, the positioning effect of the matching positioning structure 132 may be assured.

Although a preferred embodiment of the present invention has been described in detail hereinabove, it should be understood that the preferred embodiment is to be regarded in an illustrative manner rather than a restrictive manner, and all variations and modifications of the basic inventive concepts herein taught still fall within the scope of the present invention.

From the above, we can see that the foldable bicycle of the present invention meets the relevant patent requirements.

What is claimed is:

1. A foldable bicycle, comprising:
    gears;
    two wheels; and
    a frame, comprising:
        a front vertical tubular portion, including a lopsided portion horizontally disposed above a front fork and a positioning unit disposed on the lopsided portion;
        a front horizontal tubular portion, including a matching lopsided portion provided on a front end of the front horizontal tubular portion and a matching positioning member corresponding to the positioning unit provided on the matching lopsided portion;
        a rear horizontal tubular portion, wherein the gears and a rear fork are fitted on the rear horizontal tubular portion, and wherein a rear wheel of the two wheels is fitted on the rear fork, and wherein a hinge is provided between a front end of the rear horizontal tubular portion and a rear end of the front horizontal tubular portion; and
        a seat-supporting tubular portion, fitted on a seating portion to locate above the rear fork, wherein the seat-supporting tubular portion is positioned by a positioning rod,
        wherein when folding up the bicycle, first the positioning unit and the matching positioning member are disengaged to release the lopsided portion and the matching lopsided portion and then by pulling the rear horizontal tubular portion upwards the front horizontal tubular portion and the rear horizontal tubular portion may be folded up through the hinge to be positioned side by side with the front vertical tubular portion, so that the seat-supporting tubular portion may be retracted through the release of the positioning rod and the bicycle may be folded into a smallest volume.

2. The foldable bicycle as in claim 1, wherein the hinge has two pieces connected together and is fitted with an open end facing upwards, and wherein one of the two pieces is welded to the rear end of the front horizontal tubular portion and the other piece is welded to the front end of the rear horizontal tubular portion.

3. The foldable bicycle as in claim 2, wherein one or more connective units are provided on the open end of the hinge.

4. The foldable bicycle as in claim 3, wherein the one or more connective units include a catch and a lever and the lever may be used to adjust a degree of tightness, and wherein the catch is disposed on one piece of the hinge and the lever is disposed on the other piece of the hinge.

5. The foldable bicycle as in claim 1, wherein the seating portion is connected with the rear horizontal tubular portion, and wherein a first positioning portion is provided on the seat-supporting tubular portion, and a second positioning portion is provided on a front end of a rack so as to facilitate the positioning of the positioning rod.

6. The foldable bicycle as in claim 5, wherein the rack extends from the second positioning portion and one or more small wheels other than the two wheels are fitted to a rear end of the rack.

7. The foldable bicycle as in claim 5, wherein the rack extends from the second positioning portion and two small wheels other than the two wheels are fitted to a rear end of the rack.

8. The foldable bicycle as in claim 1, wherein a connective unit is provided at a mid-point of the front vertical tubular portion and a matching connective unit is provided on the rear horizontal tubular portion.

9. The foldable bicycle as in claim 8, wherein a grip portion is provided on the connective unit.

10. The foldable bicycle as in claim 1, wherein an extension portion, which extends horizontally, is provided on the lopsided portion and one or more positioning holes are provided in the extension portion, and wherein one or more retractable rods are provided in the matching lopsided portion and a number of the retractable rods is the same as a number of the positioning holes, and wherein the one or more retractable rods are controlled by a control lever.

11. The foldable bicycle as in claim 1, wherein the positioning unit is provided with a spring and is in the form of a bolt or two pins.

12. The foldable bicycle as in claim 1, wherein at least a connective member is provided on a T-shaped handle portion of the bicycle so that the T-shaped handle portion may be folded up.

13. The foldable bicycle as in claim 1, wherein a horizontally oriented female connective unit is provided on one side of the front fork and a vertically oriented male connective unit is provided on the rear fork to engage with the female connective unit after the bicycle has been folded.

* * * * *